United States Patent [19]

Hall

[11] Patent Number: 4,989,121
[45] Date of Patent: Jan. 29, 1991

[54] BRIGHT LIGHT INDICATOR

[76] Inventor: E. L. Bo Hall, Rte. 5, Box 70G, Ada, Okla. 74820

[21] Appl. No.: 421,339

[22] Filed: Oct. 13, 1989

[51] Int. Cl.⁵ .......................... B60Q 1/00; G02B 5/12
[52] U.S. Cl. ........................ 362/61; 362/282; 362/284; 362/346; 362/80.1; 350/99; 340/468
[58] Field of Search .................. 362/61, 80, 80.1, 277, 362/281, 282, 283, 284, 346; 350/97, 99, 102, 107; 340/470, 468, 471, 472, 463

[56] References Cited

U.S. PATENT DOCUMENTS

| | | | |
|---|---|---|---|
| 3,851,947 | 12/1974 | Montgomery | 350/109 |
| 4,037,197 | 7/1977 | Courty | 340/468 |
| 4,245,889 | 1/1981 | Hoffman | 350/97 |
| 4,286,308 | 8/1981 | Wolff | 362/80 |
| 4,361,828 | 11/1982 | Hose | 340/468 |
| 4,574,269 | 3/1986 | Miller | 340/470 |
| 4,600,913 | 7/1986 | Caine | 362/61 |
| 4,713,732 | 12/1987 | Schamblin | 350/97 |

Primary Examiner—Stephen F. Husar
Assistant Examiner—D. M. Cox
Attorney, Agent, or Firm—Dunlap, Codding, Peterson & Lee

[57] ABSTRACT

A bright light indicator adapted for use with a first vehicle for providing a high beam indication when a second vehicle having headlights emitting light and traveling generally behind the first vehicle has the headlights in the high beam condition. The indicator includes reflective means which are mountable on the first vehicle and positioned for receiving light emitted from the headlights of the second vehicle and for reflecting the received light generally toward the second vehicle in an on position of the reflective means, the reflected light providing the high beam indication.

14 Claims, 4 Drawing Sheets

BRIGHT LIGHT INDICATOR

FIELD OF THE INVENTION

The present invention generally relates to an indicator which is mountable on a first vehicle and adapted for providing a high beam indication when a second vehicle traveling generally behind the first vehicle has its headlights in a high beam condition.

DESCRIPTION OF THE PREFERRED EMBODIMENTS

Figure 1:
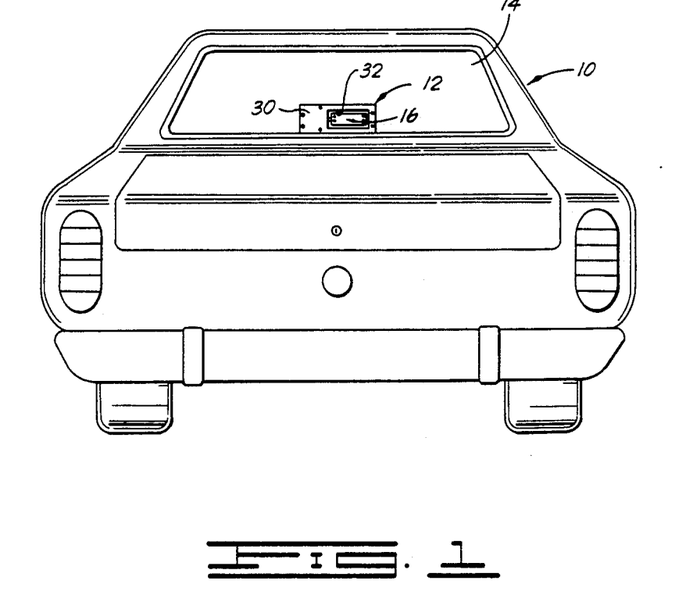
FIG. 1 is a rear elevational view of a vehicle showing an indicator constructed in accordance with the present invention mounted generally near the rear window of the vehicle.

Shown in FIG. 1 is a rear elevational view of a typical vehicle designated by the reference numeral 10 and sometimes referred to herein as the "first vehicle". An indicator 12 is mounted on the vehicle and positioned generally near a rear window 14 of the vehicle 10. The indicator 12 includes a reflective assembly 16 and the indicator 12 is positioned with respect to the rear window 14 so that the reflective assembly 16 generally faces the rear window 14. The vehicle 10 includes a vehicle power supply 18 (a battery) and the indicator 12 is connected to the power supply 18 by way of a cable 20. A momentary switch 22 is interposed in the cable 20. The switch 22 is mounted on a steering column 24 of the vehicle 10.

Figure 2:
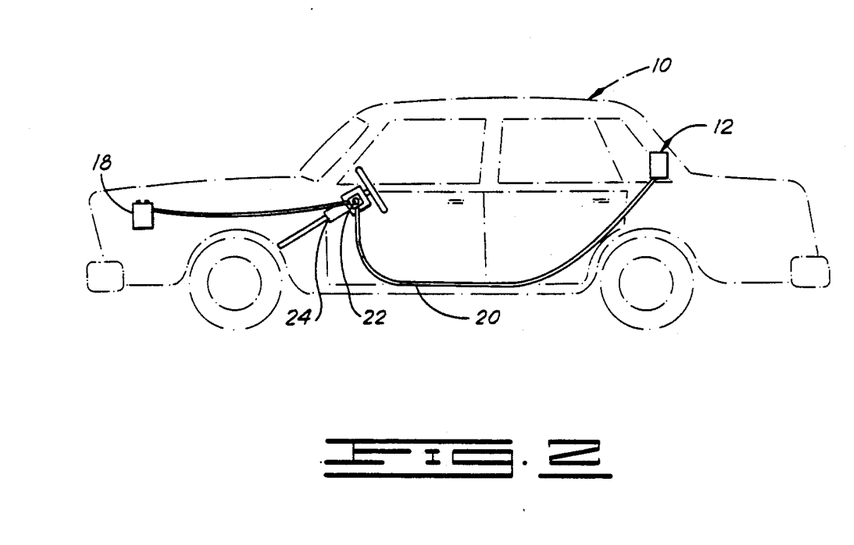
FIG. 2 shows a dashed line side view of the vehicle shown in FIG. 1 with the indicator of the present invention mounted generally near the rear window of the vehicle and showing the connection of the indicator to the vehicle power supply and showing the means for conditioning the indicator in an on condition mounted generally on the steering wheel column of the vehicle.

Although the switch 22 is shown mounted on the steering column 24, it should be noted that the switch 22 can be mounted anywhere on the vehicle 10 and positioned near the operator of the vehicle 10 so that the operator has access to the switch 22 while driving the vehicle 10. Also, although a vehicle of the automobile type has been shown in FIGS. 1 and 2, the indicator 12 of the present invention also is adapted to be used on semi-trailer trucks where the indicator 12 would be mounted on the back of the truck and the cable 20 run generally along the side and under the truck with a portion of the cable connected to the switch 22 which is positioned in the truck cab near the operator of the truck.

The indicator 10 is adapted to provide a high beam indication when a second vehicle (not shown) having headlights emitting light and traveling generally behind the first vehicle has the headlights in a high beam condition. The indicator 12 is mounted on the vehicle 10 so that the reflective assembly 16 of the indicator 10 is positioned to receive light emitted from the headlights of the second vehicle. The reflective assembly 16 is adapted to receive the light emitted from the headlights of the second vehicle and to reflect the received light in a direction generally back toward the second vehicle in an on condition of the indicator 10, the reflected light providing the high beam indication.

When the second vehicle traveling behind the first vehicle 10 has its headlights in the high beam condition, the operator of the first vehicle 10 depresses the switch 22 and conditions the indicator 12 in the on condition. In the on condition, the reflective assembly 16 receives light emitted from the headlights of the second vehicle and reflects light back generally toward the second vehicle thereby providing the high beam indication to the operator of the second vehicle. In one preferred form, the light reflected from the reflective assembly 16 is a pulsating light thereby providing a pulsating high beam indication. The desired result would be that the operator of the second vehicle would place the headlights of the second vehicle in the low beam condition upon receiving the high beam indication from the first vehicle. The indicator 12 and the reflective assembly 16 are adapted such that the reflective assembly 16 does not reflect light received from the headlights of the second vehicle in an off condition of the indicator 12.

The indicator 12 includes a base 26 (shown in FIGS. 3, 4, 5, 6 and 7). The base 26 is generally rectangularly shaped and has a support surface 28 formed on an upper side thereof.

Figure 8:
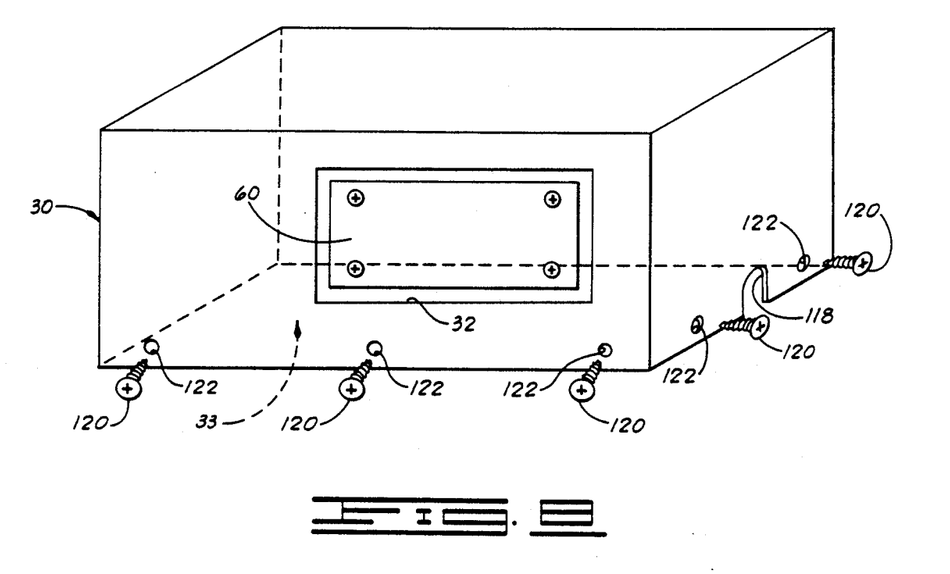
FIG. 8 is a partial perspective view of the top housing with the reflective assembly disposed therein.

As shown in FIGS. 1 and 8, generally rectangularly shaped top housing 30 is disposed generally over the base 26. The top housing 30 is connected to the base 26 and cooperates with the base 26 to encompass a component space 33 (shown in FIG. 8).

A window 32 (FIGS. 1 and 8) is formed through one side of the top housing 30. The top housing 30 can be connected to the base 26 by way of screws 120 extending through holes 122 the top housing 30 and into the sides of the base 26. The base 26 and the top housing 30 when connected together form what sometimes is referred to herein as a "housing".

As shown in FIGS. 3, 4, 5, 6 and 7, a motor 34 is supported on the support surface 28 of the base 26. One end of the cable 20 is connected to the motor 34 and the opposite end of the cable 20 is connected to the power supply 18 so that the vehicle power supply 18 (battery) provides operating power to the motor 34 for rotating an output drive shaft 36 of the motor 34 in the on condition of the indicator 12. The switch 22 is a normally opened switch and, in the open position of the switch 22, electrical continuity is interrupted between the power supply 18 and the motor 34 thereby conditioning the indicator 12 in the off condition whereby the drive shaft 36 of the motor 34 is not rotatingly driven. When the operator depresses the switch 22 the operator establishes electrical continuity between the power supply 18 and the motor 34 thereby conditioning the indicator 12 in the on condition whereby the motor 34 rotating drives the drive shaft 36 of the motor 34.

A first support post 38 is connected to the support surface 28 of the base 26 and the first support post 38 extends a distance generally upwardly from the support surface 28. A second support post 40 is connected to the support surface 28 of the base 26 and the second support post extends a distance generally upwardly from the support surface 28. The first support post 38 is spaced a distance from the second support post 40.

A reflector support 42 (FIG. 3) is disposed generally between the first support post 38 and the second support post 40. A shaft 44 extends through a central portion of the reflector support 42. The shaft 44 has opposite ends 46 and 48. The end 46 of the shaft 44 extends through an opening (not shown) in the first support post 38 and the end 46 portion of the shaft 44 is rotatingly supported in the first support post 38. The end 48 of the shaft 44 extends a distance from the reflector support 42 and the end 48 of the shaft 44 is secured to one end of the drive shaft 36 of the motor 34. Thus, in the on condition of the indicator 12, the drive shaft 36 of the motor 34 is rotatingly driven thereby rotatingly driving the shaft 44 in a direction 50. The shaft 44 comprises a portion of the reflector support 42.

Figure 3:
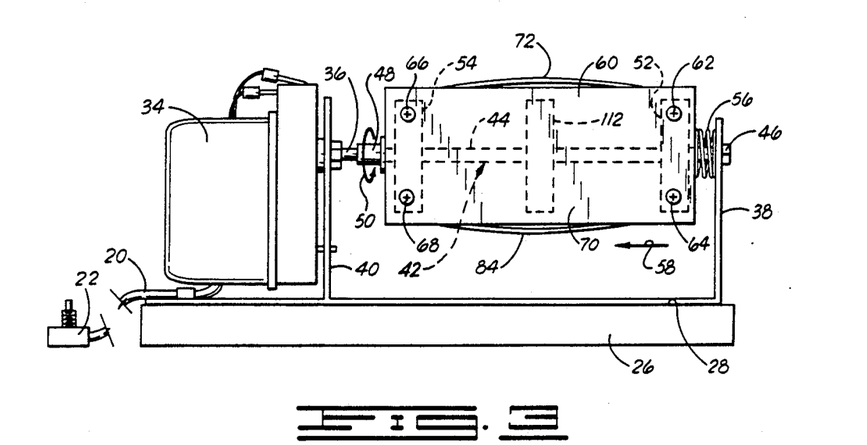
FIG. 3 is a side elevational view of the indicator with the top housing removed therefrom and showing the reflective assembly of the indicator in an off condition.
Figure 4:
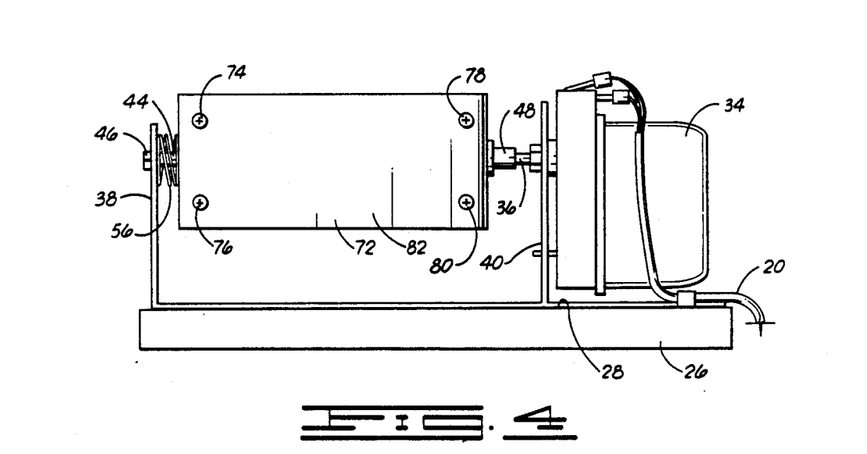
FIG. 4 is a side elevational view of the indicator of FIG. 3 with the top housing removed therefrom and showing the side, opposite the side shown in FIG. 3, and showing the reflective in one operating position in the on condition of the indicator.
Figure 5:
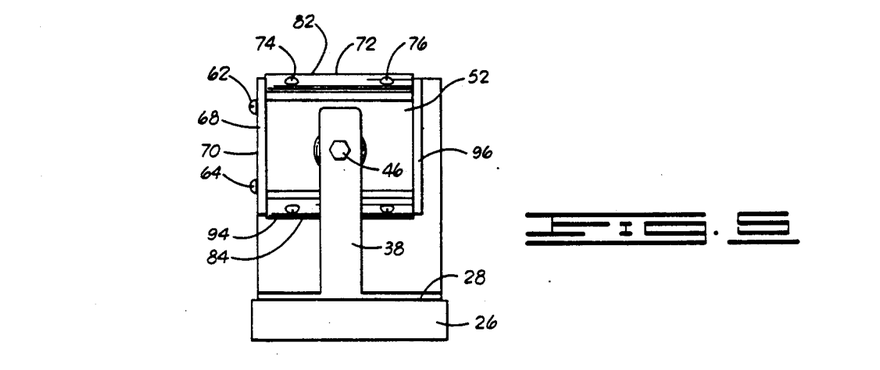
FIG. 5 is a side elevational view similar to FIG. 3 but showing the reflective assembly in the same position as shown in FIG. 4.
Figure 6:
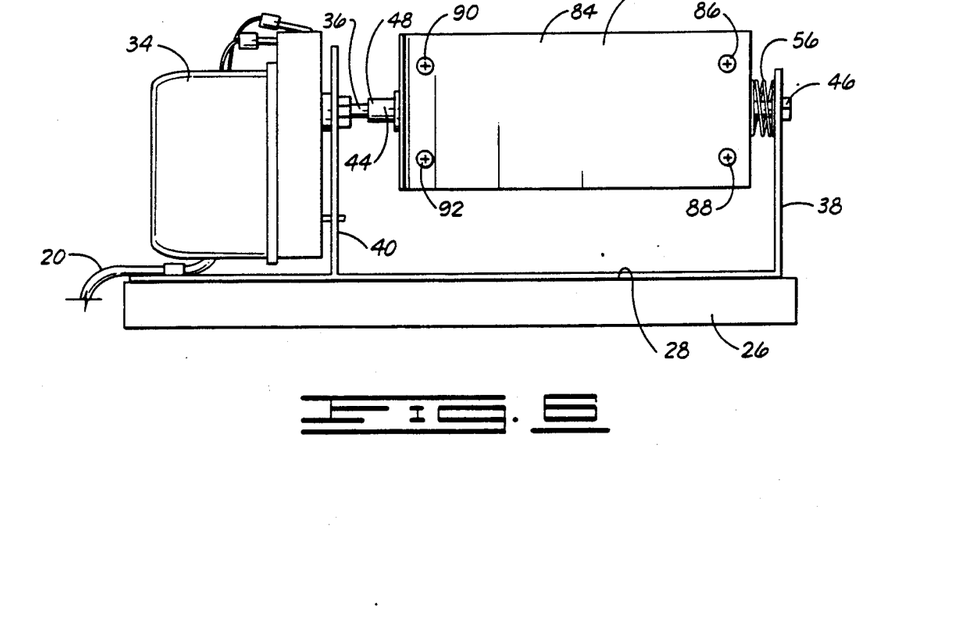
FIG. 6 is a side elevational view of the indicator of FIG. 3 with the top housing removed therefrom and showing the side, opposite the side shown in FIG. 4, and showing the reflector in one operating position in the on condition of the indicator.

The reflector support 42 more particularly comprises a pair of square-shaped end blocks 52 and 54 (FIGS. 3 and 5). The shaft 44 extends through the central portion of each of the end blocks 52 and 54 and each of the end blocks 52 and 54 are secured to the shaft 44. The end blocks 52 and 54 are spaced a distance apart on the shaft 44.

A spring 56 is disposed on the shaft 44 generally near the end 46 thereof. One end of the spring 56 engages the first end block 52 and the opposite end of the spring engages a portion of the first post 38. The spring 56 biases the reflector support 42 in a direction 58 generally toward the motor 34 for maintaining the engaging connection between the end 48 of the shaft 44 and the drive shaft 36 of the motor 34.

A generally rectangularly-shaped nonreflector 60 (FIGS. 1, 3, 5 and 8) is connected to the reflector support 42 and forms one side of the reflective assembly 16. More particularly, one end of the nonreflector 60 is connected to the first end block 52 by way of fasteners 62 and 64 and the opposite end of the nonreflector 60 is connected to the second end block 54 by way of fasteners 66 and 68. The nonreflector 60 is a rectangular plate constructed of plastic or metal having a black face 70 painted thereon to provide a nonreflective surface 70, a surface which will not reflect light.

A generally rectangularly shaped first reflector 72 (FIGS. 4 and 5) is connected to one side of the reflector support 42. More particularly, one end of the first reflector 72 is secured to the first end block 52 by way of fasteners 74 and 76 and the opposite end of the first reflector 72 is secured to the second end block 54 by way of fasteners 78 and 80. The first reflector 72 has a reflective surface 82 formed thereon which is adapted to reflect light. In one preferred form, the first reflector 72 more particularly comprises a convex mirror with the reflective surface 82 extending generally outwardly in an arc shape between the opposite ends of the first reflector 72.

A generally rectangularly shaped second reflector 84 (FIGS. 5 and 6) is connected to one side of the reflector support 42. More particularly, one end of the second reflector 84 is secured to the end block 52 by way of fasteners 90 and 92 and the opposite end of the second reflector 84 is secured to the second end block 54 by way of fasteners 90 and 92. The second reflector 84 has a reflective surface 94 formed thereon which is adapted to reflect light. In one preferred form, the second reflector 84 more particularly comprises a convex mirror with the reflective surface 94 extending generally outwardly in an arc shape between the opposite ends of the second reflector 84.

A generally rectangularly shaped third reflector 96 (FIGS. 5 and 7) is connected to one side of the reflector support 42. More particularly, one end of the third reflector 96 is secured to the first end block 52 by way of fasteners 98 and 100 and the opposite end of the third reflector 96 is secured to the second end block 54 by way of fasteners 102 and 104. The third reflector 96 has a reflective surface 106 formed thereon which is adapted to reflect light. In one preferred form, the third reflector 96 more particularly comprises a concave mirror with the reflective surface 106 extending generally inwardly in an arc shape between the opposite ends of the third reflector 96.

Figure 7:
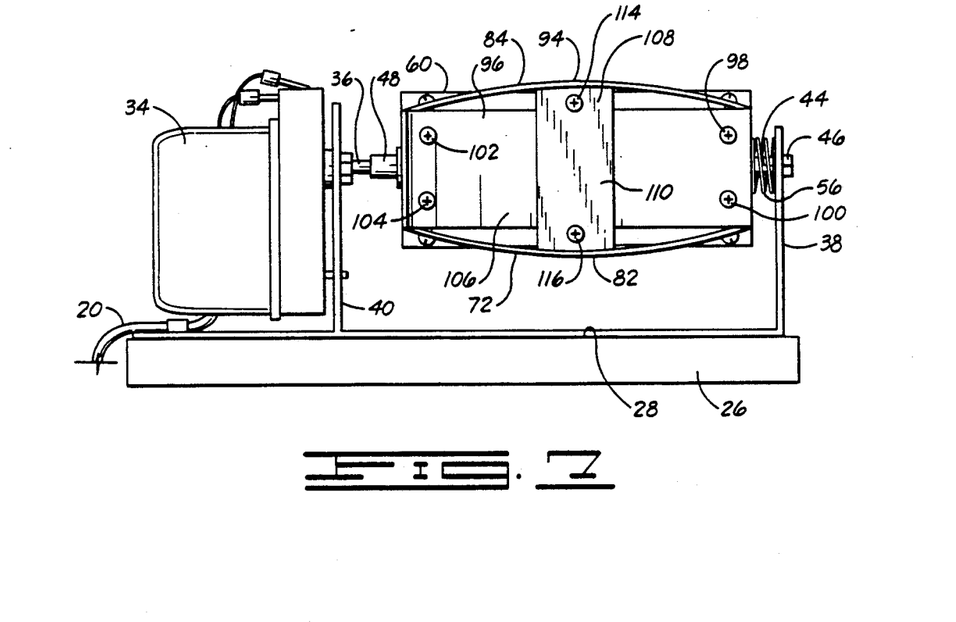
FIG. 7 is a side elevational view similar to FIG. 3, but showing the reflective assembly in one other position in the on condition of the indicator.

As shown in FIG. 7, a fourth reflector 108 having a reflective surface 110 is secured to a third end block 112 by way of fasteners 114 and 116. The shaft 44 extends through a third end block 112 (FIG. 3) and the third end block 112 is secured to the shaft 44. Third end block 112 is disposed generally between the first and second end blocks 52 and 54. The third end block 112 is shaped exactly like the first and second end blocks 52 and 54. The reflective surface 110 is generally flat in shape. The fourth reflector is generally rectangularly shaped and is positioned generally midway between the opposite ends of the third reflector 96. The third reflector 96 and the fourth reflector 108 cooperate to provide an alternative or different forms of reflective surfaces with one reflective surface 110 being substantially flat and the other reflective surface 106 being concave in shape.

The third reflector 96 and the fourth reflector 108 have been shown in the drawings for the purpose of illustrating the fact that the reflective assembly 16 may include reflective surfaces of different shapes. In a preferred embodiment, a third reflector constructed exactly like the first and second reflectors 72 and 84 and is connected to the fourth side of the first and second end blocks 52 and 54 replacing the third reflector 96 and the fourth reflector 108.

The reason the convex shaped reflectors are preferred on all three reflective sides is that these surfaces reflect light in a spread manner so that the reflected light can be seen by the operator of the second vehicle at all positions within the reflected light beam thereby substantially assuring that the reflected beam will be observed by the operator of the second vehicle. When light is reflected from the concave reflective surfaces, the reflected light crosses at some position leaving a dead or no light spot. The use of the concave reflective surface 106 in combination with the flat reflective surface 110 tends to break up the reflected light and provide a different high beam indication which may be desirable in some applications.

In operation, when a second vehicle travels behind the first vehicle 10 and when the second vehicle has its headlights on high beam, the operator of the first vehicle 10 can provide a high beam indication to the operator of the second vehicle by depressing the switch 22 thereby establishing electrical continuity between the power supply 18 and the indicator 12. As long as the operator manually depresses the switch 22, electrical continuity will remain established between the indicator 12 and the power supply 18. When the operator releases the switch 22, electrical continuity will be interrupted between the indicator 12 and the power supply 18 thereby conditioning the indicator 12 in the off condition.

In the off condition of the indicator 12, the nonreflector 60 is aligned with the window 32 in the top housing 30. Thus, in the off condition, lights from the headlights of a second vehicle generally behind the first vehicle 10 will not be reflected back toward the second vehicle by the indicator 12 since the light emitted from the headlights from the second vehicle will hit the nonreflector 60.

If the operator of the first vehicle 10 observes that the headlights of the second vehicle are on high beam and if the operator of the first vehicle 10 wishes to provide a high beam indication to the operator of the second vehicle, the operator of the first vehicle 10 depresses the switch 22 thereby establishing electrical continuity between the indicator 12 and the power supply 18. In the on condition of the indicator 12, the motor 34 driving rotates the reflector support 42 in the direction 50 (FIG. 3). The rotation of the reflector support 42 alternately brings the first reflector 72, the third reflector 96, the second reflector 84 and the nonreflector 60 into alignment with the window 32 in the top housing 30. When either the first reflector 72, the second reflector 84, or the third reflector 96 is aligned with the window 32 in the top housing 30, the light emitted from the headlights of the second vehicle hits the reflective surface 82, 94 or 106 and is reflected back to the operator of the second vehicle thereby providing the high beam indication. Since the nonreflector 60, of the first reflector 72, the second reflector 84 and the third reflector 96 alternately are positioned in alignment with the window 32 in the top housing 30, the high beam indication provided back to the operator of the second vehicle is in the form of a pulsating light source.

When the operator of the first vehicle 10 desires to position the indicator 12 in the off condition, the operator of the first vehicle 10 releases the switch 22 thereby interrupting electrical continuity between the reflective assembly 16 and the power supply 18 so that the motor 34 ceases to rotatingly drive the reflector support 42. The motor 34 is constructed and wired so that, when the motor 34 is disconnected from the power supply 18, the motor 34 continues to rotatingly drive the reflector support 42 until the nonreflector 60 is positioned in alignment with the window 32 in the top housing 30. In this manner, the nonreflector 60 always is positioned in alignment with the window 32 in the top housing 30 in the off condition of the indicator 14.

One motor which has been found suitable for operating in the manner just described with respect to the motor 34 has been a windshield wiper motor from a Volkswagen manufactured by Mabuchi, Model No. 11955113F12V(906), a twelve volt DC motor rotating at 2400 rpms with a gear reduction built in so that the output shaft 36 rotates at about 100 rpms.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. An indicator adapted for use with a first vehicle having an operator for providing a high beam indication when a second vehicle having headlights emitting light and traveling generally behind the first vehicle has the headlights in a high beam condition comprising:

reflective means mountable on the first vehicle and positionable for receiving light emitted from the headlights of the second vehicle and for reflecting the received light in a direction generally toward the second vehicle in an on condition of the reflective means, the light reflected from the reflective means providing the high beam indication; and means for conditioning the reflective means in the on condition and for conditioning the reflective means in an off position, the reflective means not reflecting light emitted from the headlights of the second vehicle in the off condition of the reflective means, said means having a portion positionable near the operator whereby said means is controllable by said operator for conditioning the reflective means in the ON or the OFF condition.

2. The indicator of claim 1 wherein the reflective means provides a pulsating high beam indication.

3. The indicator of claim 1 wherein the reflective means comprises:

a reflector support; and a reflector having a reflective surface connected to the reflector support adapted to received light emitted from the headlights of the second vehicle and adapted to reflect the received light to provide the high beam indication when the reflector is aligned with the light emitted from the lights of the second vehicle.

4. The indicator of claim 3 wherein the reflective means further comprises:

means for alternately placing the reflector in general alignment with the light emitted from the headlights of the second vehicle and for placing the reflector in a non-aligned position with respect to the light emitted from the headlights of the second vehicle.

5. The indicator of claim 1 wherein the reflective means comprises:

a reflector support;

means for rotatingly supporting the reflector support;

motor means connected to the means for rotatingly supporting the reflector support for rotating the reflector support in an on condition of the motor means;

a reflector connected to the reflector support having a reflective surface connected to the reflector support and adapted to receive light emitted from the headlights of the second vehicle and adapted to reflect the received light to provide the high beam indication;

a non-reflector which will substantially not reflect light, the non-reflector being connected to the reflector support;

a housing having a component space and a window formed through a portion of the housing, the reflector support, the means for rotatingly supporting the reflector support and the motor means each being disposed generally within the component space of the housing and positioned therein so that the nonreflector is generally aligned with the housing opening in the off condition of the motor means, the motor means rotatingly driving the reflector support in the on condition of the motor means to sequentially bring the reflector into alignment with the window and the non-reflector into alignment with the window, the reflector reflecting the light emitted from the headlights of the second vehicle and reflecting the received light to provide the high beam indication when the reflector is in alignment with the window in the housing.

6. The indicator of claim 1 wherein the vehicle is defined further as having a power supply and wherein the means for conditioning the reflective means in the ON condition and for conditioning the reflective means in the OFF position further comprises:
   a cable connected to the motor means and to the power supply for providing operating power to the motor means when electrical continuity is established in the cable between the power supply and the motor means; and
   a switch interposed in the cable having one position establishing electrical continuity between the power supply and the motor means and one other position interrupting electrical continuity between the power supply and the motor means, the switch being mountable generally near the operator of the first vehicle.

7. An indicator adapted for use with a first vehicle having an operator for providing a high beam indication when a second vehicle having headlights emitting light and traveling generally behind the first vehicle has the headlights in a high beam condition comprising:
   reflective means mountable on the first vehicle and positionable for receiving light emitted from the headlights of the second vehicle and for reflecting the received light in a direction generally toward the second vehicle in an on condition of the reflective means, the light reflected from the reflective means providing the high beam indication; and
   a reflector support;
   means for rotatingly supporting the reflector support;
   motor means connected to the means for rotatingly supporting the reflector support for rotating the reflector support in an on condition of the motor means;
   a reflector connected to the reflector support having a reflective surface connected to the reflector support and adapted to receive light emitted from the headlights of the second vehicle and adapted to reflect the received light to provide the high beam indication;
   a non-reflector which will substantially not reflect light, the non-reflector being connected to the reflector support; and
   a housing having a component space and a window formed through a portion of the housing, the reflector support, the means for rotatingly supporting the reflector support and the motor means each being disposed generally within the component space of the housing and positioned therein so that the non-reflector is generally aligned with the housing opening in the off condition of the motor means, the motor means rotatingly driving the reflector support in the on condition of the motor means to sequentially bring the reflector into alignment with the window and the non-reflector into alignment with the window, the reflector reflecting the light emitted from the headlights of the second vehicle and reflecting the received light to provide the high beam indication when the reflector is in alignment with the window in the housing.

8. The indicator of claim 7 wherein the reflector is defined further as having a generally convex reflective surface.

9. The indicator of claim 7 wherein the reflector is defined further as having a generally concave reflective surface.

10. The indicator of claim 7 wherein the vehicle is defined further as having a power supply and wherein the indicator further comprises:
   a cable connected to the motor means and to the power supply for providing operating power to the motor means when electrical continuity is established in the cable between the power supply and the motor means; and
   a switch interposed in the cable having one position establishing electrical continuity between the power supply and the motor means and one other position interrupting electrical continuity between the power supply and the motor means, the switch being mountable generally near the operator of the first vehicle.

11. An indicator adapted for use with a first vehicle having an operator for providing a high beam indication when a second vehicle having headlights emitting light and traveling generally behind the first vehicle has the headlights in a high beam condition comprising:
   reflective means mountable on the first vehicle and positionable for receiving light emitted from the headlights of the second vehicle and for reflecting the received light in a direction generally toward the second vehicle in an on condition of the reflective means, the light reflected from the reflective means providing the high beam indication; comprising:
   at least two reflectors, each reflector having a reflective surface support;
   means for rotatingly supporting the reflector support;
   motor means connected to the means for rotatingly supporting the reflector support for rotating the reflector support in an on condition of the motor means;
   at least two reflectors, each reflector having a reflective surface connected to the reflector support and adapted to receive light emitted from the headlights of the second vehicle and adapted to reflect the received light to provide the high beam indication;
   a non-reflector which will substantially not reflect light, the non-reflector being connected to the reflector support; and
   a housing having a component space and a window formed through a portion of the housing, the reflector support, the means for rotatingly supporting the reflector support and the motor means each being disposed generally within the component space of the housing and positioned therein so that the non-reflector is generally aligned with the housing opening in the off condition of the motor means, the motor means rotatingly driving the reflector support in the on condition of the motor means to sequentially bring the reflectors into alignment with the window and the non-reflector into alignment with the window, the reflectors reflecting the light emitted from the headlights of the second vehicle and reflecting the received light to provide the high beam indication when the reflectors are in alignment with the window in the housing.

12. The indicator of claim 11 wherein the reflective surface of each reflector is defined further as being generally concave.

13. The indicator of claim 11 wherein the reflective surface of each reflector is defined further as being generally convex.

14. The indicator of claim 11 wherein the vehicle is defined further as having a power supply and wherein the indicator further comprises:

a cable connected to the motor means and to the power supply for providing operating power to the motor means when electrical continuity is established in the cable between the power supply and the motor means; and a switch interposed in the cable having one position establishing electrical continuity between the power supply and the motor means and one other position interrupting electrical continuity between the power supply and the motor means, the switch being mountable generally near the operator of the first vehicle.

* * * * *

UNITED STATES PATENT AND TRADEMARK OFFICE
CERTIFICATE OF CORRECTION

PATENT NO. : 4,989,121

DATED : January 29, 1991

INVENTOR(S) : E. L. Bo Hall

It is certified that error appears in the above-identified patent and that said Letters Patent is hereby corrected as shown below:

Column 7, line 68, after the word, window, the following phrase should be inserted: --and the non-reflector into alignment with the window--.

Signed and Sealed this

Fourth Day of August, 1992

Attest:

DOUGLAS B. COMER

*Attesting Officer*    Acting Commissioner of Patents and Trademarks